United States Patent
Hirose

(10) Patent No.: US 8,911,007 B2
(45) Date of Patent: Dec. 16, 2014

(54) VEHICLE FRONT STRUCTURE

(71) Applicant: Honda Motor Co., Ltd, Minato-ku, Tokyo (JP)

(72) Inventor: Yoshitaka Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/677,433

(22) Filed: Nov. 15, 2012

(65) Prior Publication Data

US 2013/0134740 A1  May 30, 2013

(30) Foreign Application Priority Data

Nov. 25, 2011 (JP) ................................. 2011-257468

(51) Int. Cl.
  *B60R 19/52* (2006.01)
  *B60K 11/08* (2006.01)
  *B60R 19/18* (2006.01)

(52) U.S. Cl.
  CPC ............. *B60K 11/08* (2013.01); *B60R 19/18* (2013.01); *B60R 2019/1886* (2013.01); *B60R 2019/527* (2013.01)
  USPC ........................................ 296/193.1; 293/115

(58) Field of Classification Search
  CPC .............................. B60R 19/52; B60K 11/08
  USPC ............... 296/193.09, 193.1, 199, 203.02; 180/68.4; 293/117, 154, 155
  See application file for complete search history.

(56) References Cited

U.S. PATENT DOCUMENTS 7,520,561 B2 * 4/2009 Nakamae et al. ........ 296/193.09

FOREIGN PATENT DOCUMENTS

JP 2010-254116 A 11/2010

* cited by examiner

*Primary Examiner* — Glenn Dayoan
*Assistant Examiner* — Melissa A Black
(74) *Attorney, Agent, or Firm* — Westerman, Hattori, Daniels & Adrian, LLP

(57) ABSTRACT

Provided is a vehicle front structure including a front bumper and a lower grille. The front bumper includes a front-bumper lower surface extending in a vehicle rear direction, the front-bumper lower surface having a pair of bottom surface portions at respective side portions and a recessed surface at a center portion, the recessed surface extending from the pair of bottom surface portions and being recessed in an upper direction. The lower grille includes an annular portion arranged at the lower side of a rear end of the recessed surface and forming an opening, a protruding portion protruding from a lower portion of the annular portion so as to protrude in a front direction and oppose to the recessed surface, and a reinforcing portion extending from an upper portion of the annular portion to a back surface of the recessed surface and reinforcing the front-bumper lower surface.

7 Claims, 7 Drawing Sheets

VEHICLE FRONT STRUCTURE

CROSS REFERENCES TO RELATED APPLICATIONS

The present application claims priority under 35 U.S.C. §119 to Japanese Patent Application No. 2011-257468, filed Nov. 25, 2011, entitled "Vehicle-body Front-part Structure." The contents of this application are incorporated herein by reference in their entirety.

TECHNICAL FIELD

The present application relates to a vehicle front structure including a lower grille on the lower side of a front bumper, and more particularly relates to a vehicle front structure having a safety plate function.

BACKGROUND

In related art, there is a vehicle front structure including a lower grille for cooling a radiator etc. provided on the lower side of a front bumper as disclosed in Japanese Unexamined Patent Application Publication No. 2010-254116.

Also, Japanese Unexamined Patent Application Publication No. 2010-254116 discloses the collision energy absorbing structure in which the lower grille arranged on the lower side of the front bumper has a low rigidity to protect a pedestrian and absorbs collision energy if a pedestrian collides with the front bumper.

Meanwhile, a vehicle front structure in recent years includes a safety plate provided at a front bumper to protect a pedestrian. The safety plate sweeps the legs of the pedestrian. Accordingly, if the pedestrian collides with the front bumper, below knee portions of the pedestrian are swept and the pedestrian is lifted on a hood without buckling of the front bumper. Thus, the impact of the collision is reduced.

In the following description, sweeping the below knee portions of the pedestrian and lifting the pedestrian on the hood is called safety plate function.

However, with the vehicle front structure including the lower grille of related art, since the lower grille has the low rigidity, the lower grille cannot provide the safety plate function.

In contrast, if the safety plate is provided at the vehicle front structure including the lower grille of related art, the number of parts is increased, thereby disturbing demand for reduction in the number of parts. Also, the increase in the number of parts results in an increase in the number of mounting steps. This is not preferable.

SUMMARY

Accordingly, it is desirable to provide a vehicle front structure having a safety plate function without an increase in the number of parts.

To address the problems, a vehicle front structure according to an aspect includes a front bumper arranged at a vehicle front and extending in a vehicle width direction; and a lower grille arranged on a lower side of the front bumper and having an opening, outside air flowing into a vehicle through the opening. The front bumper includes a front-bumper lower surface extending in a vehicle rear direction along a lower end extending in the vehicle width direction. The front-bumper lower surface has a pair of bottom surface portions at both side portions, the pair of bottom surface portions forming a bottom surface of the front bumper; and a recessed surface at a center portion, the recessed surface extending from the pair of bottom surface portions and being recessed in an upper direction. The lower grille includes an annular portion arranged on the lower side of a rear end of the recessed surface and forming the opening, a protruding portion protruding from a lower portion of the annular portion so as to protrude in a front direction to oppose to the recessed surface, an extending portion extending from a rear end of the protruding portion to an area between the pair of bottom surface portions and mounted to the pair of bottom surface portions, and a reinforcing portion extending from an upper portion of the annular portion to a back surface of the recessed surface and reinforcing the front-bumper lower surface.

With the vehicle front structure according to the aspect, the extending portion of the lower grille is mounted between the pair of bottom surface portions of the front bumper. Hence, the lower grille is mounted to the lower side of the front bumper in integral manner such that the lower grille closes the recessed surface of the front-bumper lower surface from the lower side.

Since the reinforcing portion for reinforcing the front-bumper lower surface is provided at the upper side of the annular portion (the opening) of the lower grille, the rigidity of a portion near the front-bumper lower surface is increased.

Meanwhile, the protruding portion protruding in the front direction and having a high strength is provided on the lower side of the annular portion (the opening) of the lower grille.

Since the lower portion of the front bumper provided with the lower grille has higher rigidity, if a pedestrian collides with the front bumper, the below knee portions of the pedestrian are swept and the pedestrian can be lifted on a hood. Thus, the safety plate function can be provided.

Also, since the lower grille including the reinforcing portion and the protruding portion does not need installation of a safety plate, an increase in the number of parts can be avoided.

Also, with the vehicle front structure, the protruding portion of the lower grille protrudes so as to protrude in the front direction. The protruding portion has a certain width in the up-down direction and can receive an impact load by a plane. Hence, the legs of the pedestrian, who has contacted or collided with the protruding portion of the lower grille, can be protected.

Also, with the vehicle front structure, the protruding portion provided at the front side of the extending portion of the lower grille opposed to the recessed surface of the front bumper, and has a flow path through which the outside air at a front surface of the vehicle is introduced into the vehicle.

Also, the lower-grille annular portion (the opening) is arranged at the rear end of the recessed surface and the protruding portion. Hence, the outside air flowing to the flow path formed by the recessed surface and the protruding portion is introduced into the vehicle, and can cool the radiator etc.

The protruding portion may preferably include a fold-back portion extending from the lower portion of the annular portion in the front direction to oppose to the recessed surface, being folded back, and extending in the rear direction to continuously extend to the extending portion; and a partition wall that partitions an inner side of the fold-back portion in the vehicle width direction. A rear end of the partition wall is preferably cut.

With the above-described configuration, the protruding portion includes the fold-back portion extending in the front direction, being folded back, and extending in the rear direction. Hence, the weight can be reduced.

Also, since the partition wall is provided at the inner side of the fold-back portion, the fold-back portion has higher rigidity, and the safety plate function can be further reliably provided.

Further, since the rear end of the partition wall is cut, if the lower grille is manufactured by integral molding, a shrink mark which is generated at an outer surface of the fold-back portion can be restricted.

The protruding portion may preferably include a fold-back portion protruding from the lower portion of the annular portion in the front direction to oppose to the recessed surface, being folded back, and extending in the rear direction to continuously extend to the extending portion; and a partition wall that partitions an inner side of the fold-back portion in the vehicle width direction. The extending portion may preferably include a plurality of vertical walls arranged at an upper surface and extending in a front-rear direction. The partition wall may preferably continuously extend to any of the plurality of vertical walls in the front-rear direction.

With the above-described configuration, since the protruding portion includes the fold-back portion, the weight can be reduced. Also, since the partition wall is provided in the fold-back portion, the fold-back portion has higher rigidity.

Also, the extending portion provided with the plurality of vertical walls at the upper surface has higher rigidity against an input of a load from the front side.

Since the partition wall continuously extends to the vertical wall, the entire lower grille has higher rigidity, and the safety plate function can be further reliably provided.

Also, since the plurality of vertical walls provided at the upper surface of the extending portion extend in the front-rear direction, the vertical walls have a rectifying function for rectifying the outside air flowing through the opening. Cooling performance of the vehicle can be increased.

The extending portion may be preferably formed in a substantially horizontal plane. The bottom surface of the front bumper formed by the pair of bottom surface portions and the extending portion mounted between the pair of bottom surface portions may be preferably a substantially flat plane.

With the above-described configuration, since the extending portion is formed in the substantially horizontal plane, the extending portion has the function for rectifying the outside air flowing through the opening, and the cooling performance of the vehicle can be increased.

Also, with the above-described configuration, since the bottom surface of the front bumper is the substantially flat plane, the function for rectifying the outside air flowing along the bottom surface of the front bumper is provided and aerodynamic performance can be increased.

The front bumper may preferably have a design member at a front surface. The lower grille may preferably have a coupling portion coupled with the design member.

With the above-described configuration, the lower grille is coupled with the design member mounted to the front bumper. The fixing strength of the lower grille is increased. Hence, the rigidity of the lower grille is increased at the front part of the vehicle. The lower grille can further reliably function as a safety plate.

The front bumper may preferably include a front-bumper upper surface extending from an upper end toward the vehicle rear direction, and a pair of front-bumper side surfaces extending from both left and right ends toward the vehicle rear direction. The lower grille may preferably include a weight member fixed to a center portion in the vehicle width direction of the extending portion. The front-bumper upper surface may be preferably supported by a frame member of the vehicle. The pair of front-bumper side surfaces may be preferably supported by fenders provided at both side portions of the vehicle.

With the above-described configuration, the front bumper is supported by the frame member of the vehicle through the bumper upper surface at the upper portion, and the front bumper is supported by the fenders through bumper side surfaces at the side portions. Thus, the front bumper can be mounted to the front part of the vehicle.

In contrast, the lower portion of the front bumper is not supported. Hence, vibration is likely generated by oscillation of an engine. However, since the extending portion of the lower grille arranged at the lower portion of the front bumper has the weight member, the vibration can be restricted.

Also, since the weight member is provided at the proper position of the extending portion of the lower grille, a specific vibration frequency of the lower portion of the front bumper can be changed, and resonance with an idling frequency can be avoided.

Further, with the above-described configuration, the weight member provided at the extending portion of the lower grille increases the rigidity of the lower grille. The lower grille mounted on the lower side of the front bumper can further reliably function as a safety plate.

As described above, according to the aspect, the vehicle front structure that has the safety plate function and can protect a pedestrian without an increase in the number of parts can be provided.

BRIEF DESCRIPTION OF THE DRAWINGS

The advantages of the disclosure will become apparent in the following description taken in conjunction with the following drawings.

DETAILED DESCRIPTION

Figure 1:
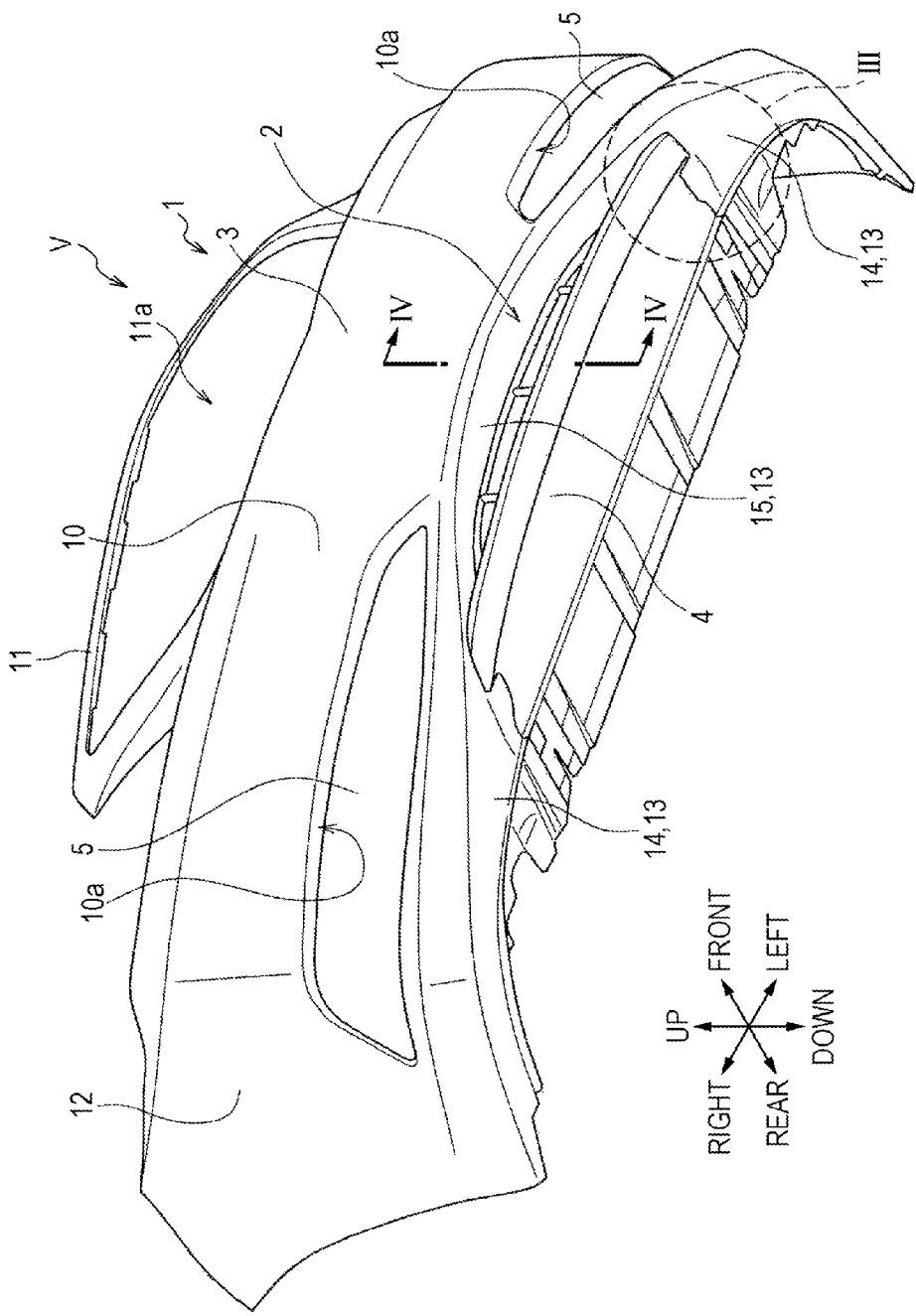
FIG. 1 is a perspective view of a front bumper and a lower grille arranged in a vehicle front part when viewed from the lower right side.

A vehicle front structure according to an embodiment is described with reference to the drawings.

In the description of the vehicle front structure according to the embodiment, the same reference characters are applied to the technically same elements.

Also, in the description of the embodiment, the front-rear direction of a vehicle is merely referred to as the front-rear direction. The vehicle width direction of the vehicle is merely referred to as the left-right direction in view of a driver, and the height direction of the vehicle is merely referred to as the up-down direction.

Figure 2:
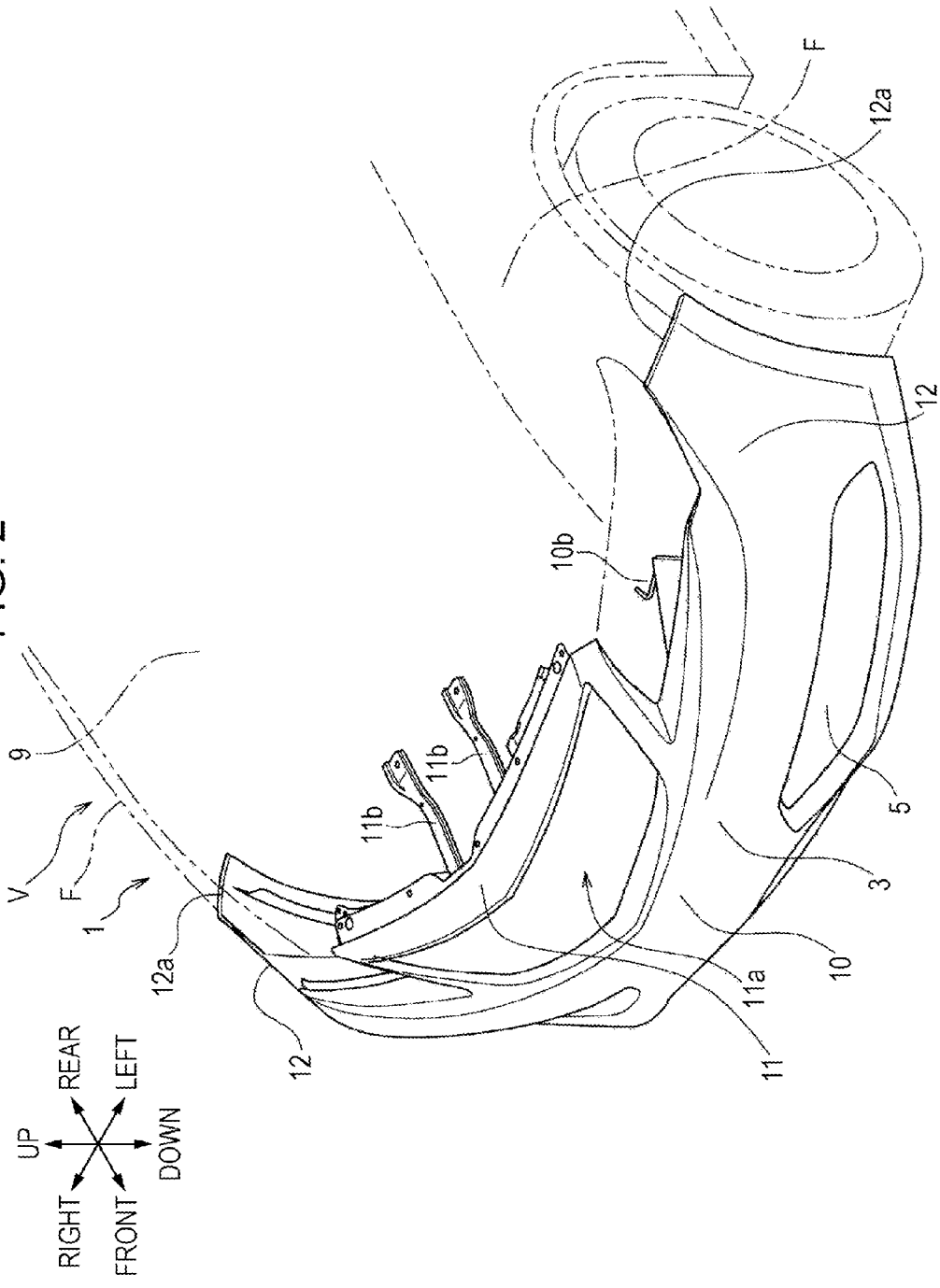
FIG. 2 is a perspective view of a vehicle according to an embodiment when viewed from the upper left side.

FIG. 1 is a perspective view of a front bumper 3 and a lower grille 4 arranged in a vehicle front part 1 when viewed from the lower right side. FIG. 2 is a perspective view of a vehicle V according to the embodiment when viewed from the upper left side.

As shown in FIG. 1, the vehicle front part 1 of the vehicle V according to the embodiment has an opening 2. The outside air for cooling a radiator etc. is introduced into the vehicle V through the opening 2.

The vehicle front part 1 of the vehicle V also includes the front bumper 3 extending in the left-right direction, and the lower grille 4 mounted on the lower side of the front bumper 3.

The front bumper 3 is formed of resin by molding. As shown in FIG. 1, the front bumper 3 includes a front-bumper front surface 10, a front-bumper upper surface 11 provided at an upper portion of the front-bumper front surface 10, a front-bumper side surfaces 12 provided at both side portions of the front-bumper front surface 10, and a front-bumper lower surface 13 provided at a lower portion of the front-bumper front surface 10. The front-bumper front surface 10, the front-bumper upper surface 11, the front-bumper side surfaces 12, and the front-bumper lower surfaces 13 are integrally formed.

As shown in FIG. 1, the front-bumper front surface 10 is formed to be a substantially flat plane, and has openings 10a formed at both sides for mounting fog lamps 5. The fog lamps 5 are mounted to the openings 10a.

The fog lamps 5 are supported by brackets 5a (see FIG. 5) at a back surface of the front-bumper front surface 10. The fog lamps 5 and the brackets 5a form a structure corresponding to a "design member."

As shown in FIG. 2, the front-bumper front surface 10 has a mount portion (not shown) for mounting a first mount beam 10b, at an upper portion of the back surface. A first end of the first mount beam 10b is mounted to the mount portion (not shown) and hence is supported by the vehicle front part 1. A second end of the first mount beam 10b is fixed to a frame member (not shown) of the vehicle V.

As shown in FIGS. 1 and 2, the front-bumper upper surface 11 extends from an upper end portion of the front-bumper front surface 10 toward the rear direction, and has an upper-grille opening 11a for mounting an upper grille (not shown), at a center portion.

As shown in FIG. 2, the front-bumper upper surface 11 has mount portions (not shown) for mounting first ends of second mount beams 11b, at the upper portion of the back surface. The first ends of the second mount beams 11b are mounted to the mount portions (not shown) and are supported by the vehicle front part 1. Second ends of the second mount beams 11b are fixed to the frame member (not shown) of the vehicle V.

As shown in FIGS. 1 and 2, the front-bumper side surfaces 12 extend from both sides of the front-bumper front surface 10 toward the rear direction, and form side surfaces of the vehicle front part 1.

Also, the front-bumper side surfaces 12 have coupling portions 12a formed at rear end portions thereof. The coupling portions 12a are coupled with fenders F located on the rear side thereof and are supported by the vehicle front part 1.

As shown in FIG. 1, the front-bumper lower surface 13 extends in the rear direction along a lower end extending in the left-right direction of the front-bumper front surface 10. The front-bumper lower surface 13 includes a pair of bottom surface portions 14, 14 at both side portions and a recessed surface 15 at a center portion. The bottom surface portions 14, 14 are substantially flat planes and form a bottom surface of the front bumper 3. The recessed surface 15 is recessed in the upper direction.

Figure 3:
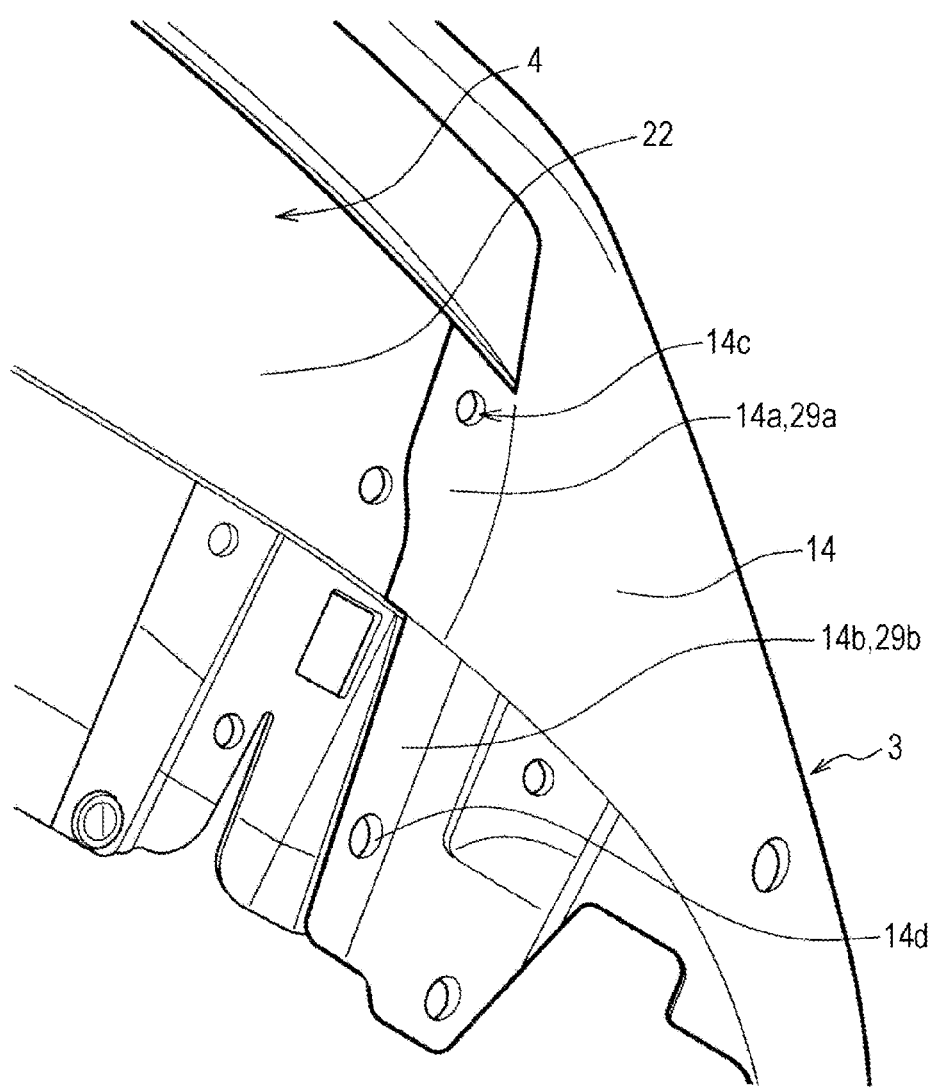
FIG. 3 is an enlarged view showing an area surrounded by broken line III in FIG. 1 in an enlarged manner.

FIG. 3 is an enlarged view of an area indicated by broken line III in FIG. 1.

As shown in FIG. 3, each bottom surface portion 14 has a bottom surface formed in a substantially flat plane. The bottom surface portion 14 extends inward from an inner side of the front bumper 3, and has a coupling portion 14a and an overlay portion 14b that are coupled with the adjacent lower grille 4.

The coupling portion 14a is housed in a coupling-portion housing 29a (described later, see FIG. 6) of the lower grille 4, and has a hole 14c for fastening with a bolt.

The overlay portion 14b is overlaid with a step 29b (described later, see FIG. 6) of the lower grille 4 in the up-down direction, and has a hole 14d for fastening with a clip.

Figure 4:
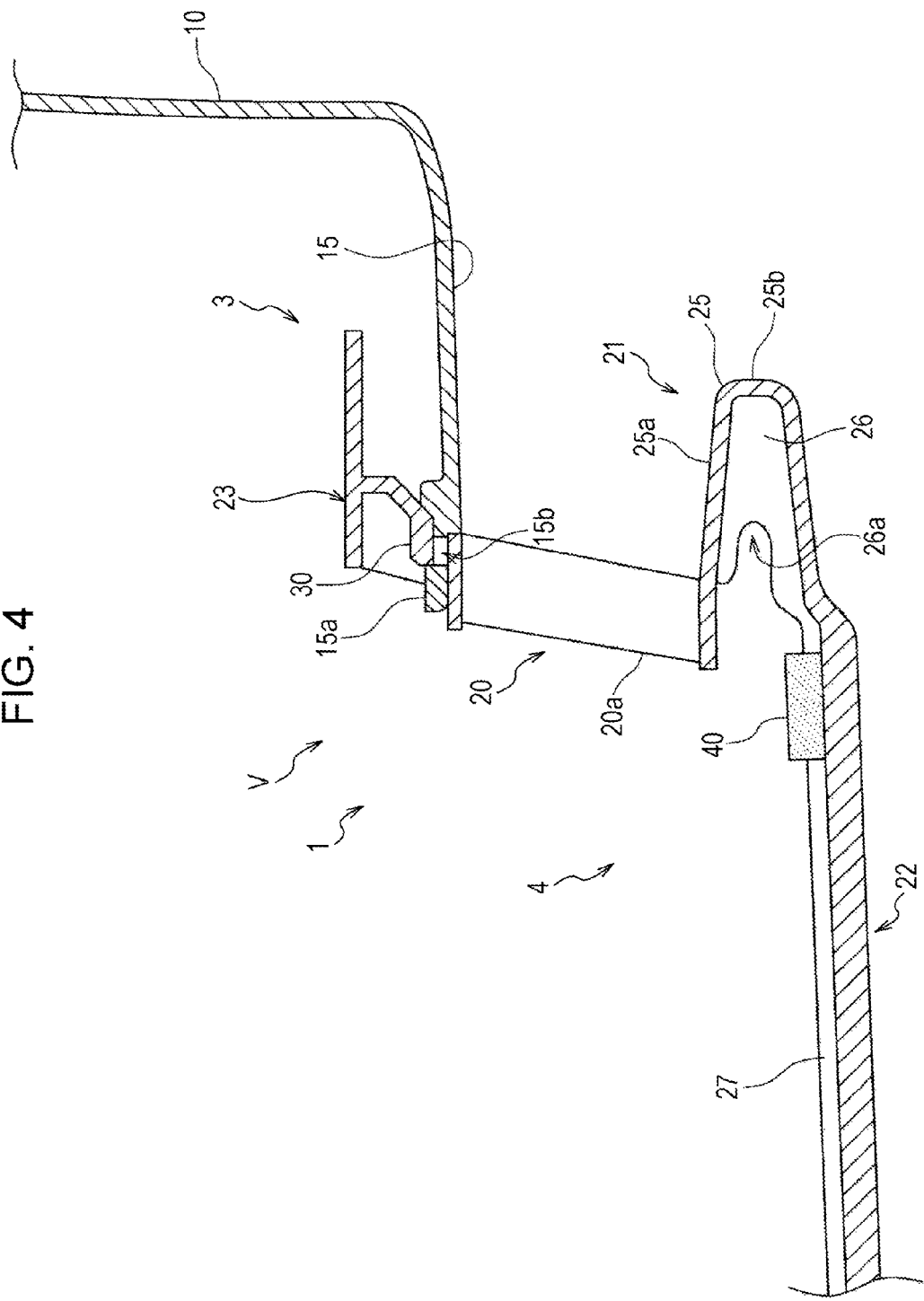
FIG. 4 is a cross-sectional view taken along line IV-IV in FIG. 1.

FIG. 4 is a cross-sectional view taken along line IV-IV in FIG. 1.

As shown in FIG. 1, the recessed surface 15 is a curved surface to be recessed in the upper direction, and is formed in the shape conforming to the shape of an upper portion of an annular portion 20 (described later, see FIG. 4). As shown in FIG. 4, the recessed surface 15 extends in the rear direction, and has a lower surface that is a substantially flat plane.

Figure 7:
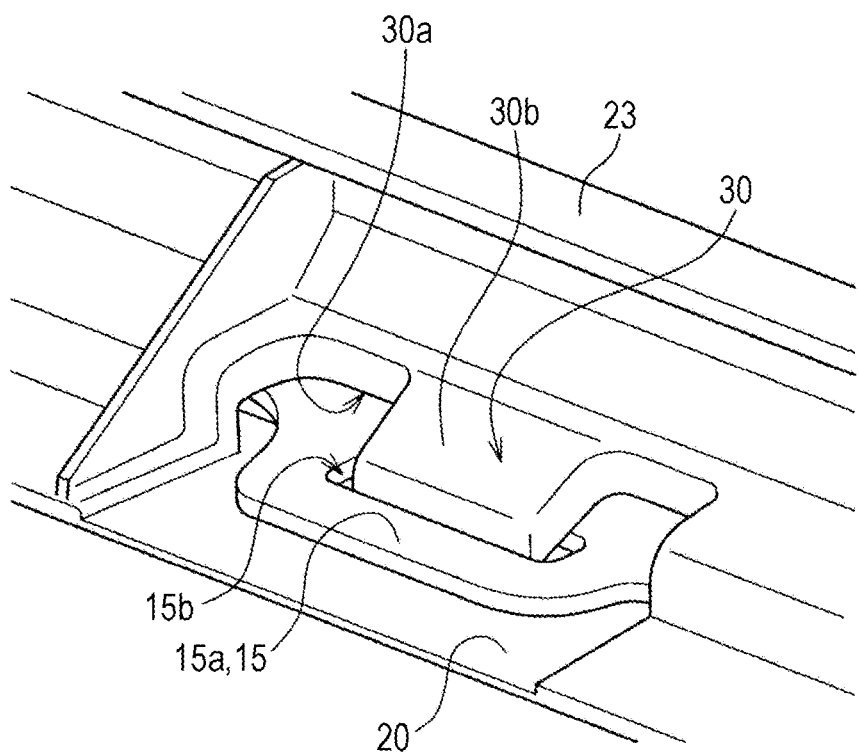
FIG. 7 is an enlarged view showing an area surrounded by broken line VII in FIG. 5 in an enlarged manner.

As shown in FIGS. 4 and 7, the recessed surface 15 has an engaged portion 15a at a rear portion of an upper surface. The engaged portion 15a extends in the rear direction and in a substantially U shape when viewed from the upper side. The engaged portion 15a has a hole 15b. A claw 30b (described later) is inserted into the hole 15b.

Figure 5:
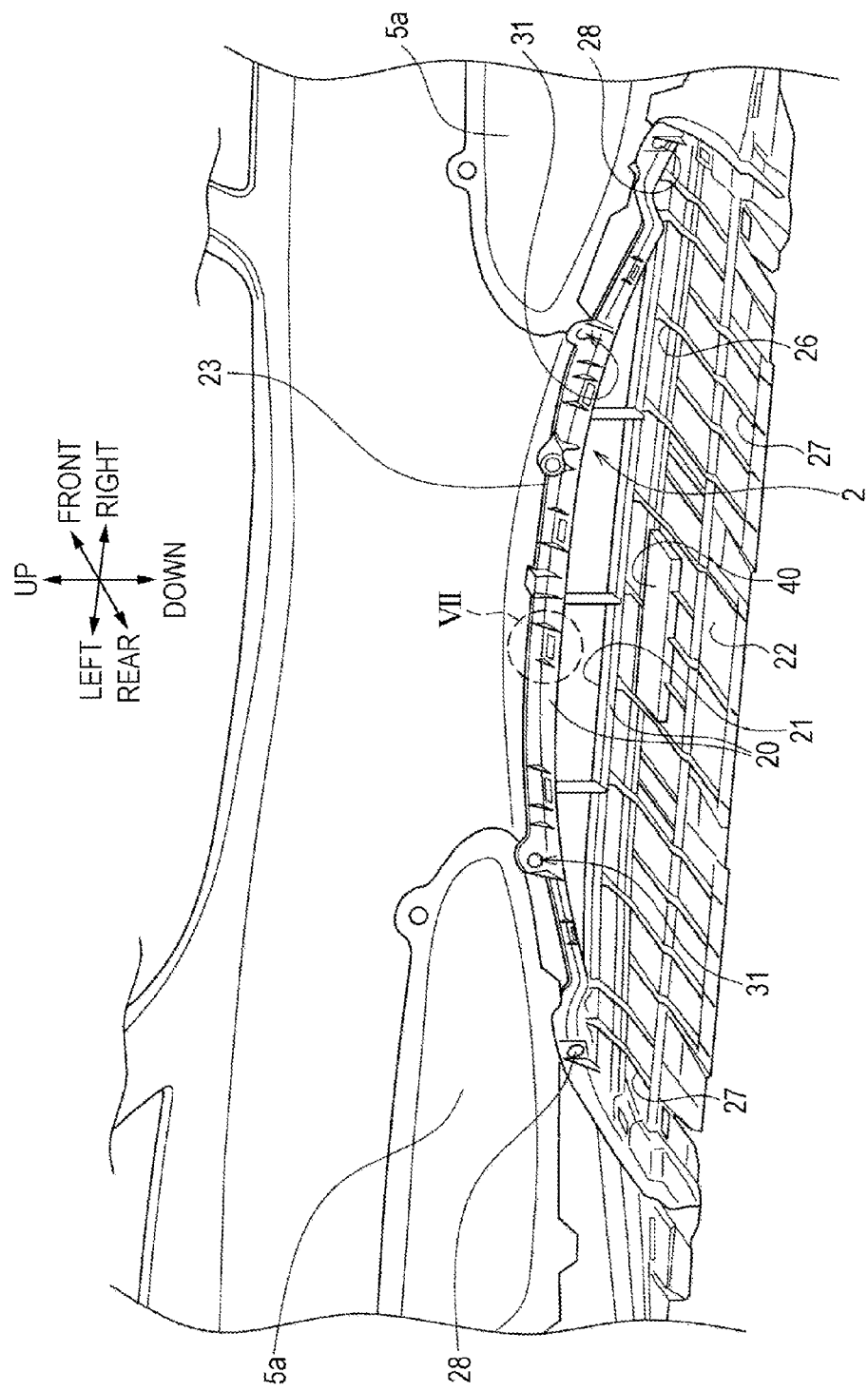
FIG. 5 is a perspective view of the lower grille that is coupled with the front bumper when viewed from the upper side of a back surface thereof.

FIG. 5 is a perspective view of the lower grille 4 that is coupled with the front bumper when viewed from the upper side of a back surface.

The lower grille 4 is formed of resin by molding. As shown in FIGS. 4 and 5, the lower grille 4 includes the annular portion 20 forming the opening 2, a protruding portion 21 protruding from a lower portion of the annular portion 20 in the front direction, an extending portion 22 extending from a rear end of the protruding portion 21 in the rear direction, and a reinforcing portion 23 provided at an upper portion of the annular portion 20. The annular portion 20, the protruding portion 21, the extending portion 22, and the reinforcing portion 23 are integrally formed.

As shown in FIGS. 4 and 5, the annular portion 20 has an annular shape, and has an opening at a center portion, so that the outside air can pass through the opening.

The annular portion 20 has a rib 20a arranged on the inner side and extending in the up-down direction. Hence, the rigidity of the annular portion 20 is increased, and the outside air passing through the annular portion 20 is rectified.

As shown in FIG. 4, the protruding portion 21 includes a fold-back portion 25 provided at the lower portion of the annular portion 20, and a partition wall 26 provided on the inner side of the fold-back portion 25.

As shown in FIG. 4, the fold-back portion 25 extends from the lower portion of the annular portion 20 toward the front direction, is folded back to the lower side, extends in the rear direction, and continuously extends to a front end portion of the extending portion 22.

The fold-back portion 25 has a surface 25a extending from the lower portion of the annular portion 20 in the front direction. As shown in FIG. 4, the surface 25a opposes to the recessed surface 15 of the front-bumper lower surface 13 arranged on the upper side, with a gap interposed therebetween.

Hence, the surface 25a of the fold-back portion 25 and the recessed surface 15 form a flow path extending from the open front side to the opening 2 arranged on the rear side for introducing the outside air. Since, the surface 25a of the fold-back portion 25 continuously extends to the annular portion 20, the surface 25a is flush with the annular portion 20.

As shown in FIG. 4, the fold-back portion 25 also has a surface 25b extending in the up-down direction, so that the fold-back portion 25 is folded back from the front side to the rear side.

As shown in FIG. 4, the partition wall 26 extends in the up-down direction and the front-rear direction in a space on the inner side of the fold-back portion 25, and partitions the space on the inner side of the fold-back portion 25 in the vehicle width direction. Accordingly, the rigidity of the fold-back portion 25 in the front-rear direction is increased.

The partition wall 26 also has a notch 26a formed at the center of a rear end portion. Accordingly, when the protruding portion 21 is integrally molded, a shrink mark can be prevented from being generated at the fold-back portion 25.

The extending portion 22 extends from a rear end of the fold-back portion 25 of the protruding portion 21 toward the rear direction to be a flat plane such that the extending portion 22 is arranged between the pair of bottom surface portions 14, 14 of the front-bumper lower surface 13. The extending portion 22 is formed such that an upper surface and a bottom surface thereof are substantially flat planes.

A rear end portion of the extending portion 22 is fastened to an under cover (not shown) arranged on the rear side thereof by a clip and hence is supported.

Figure 6:
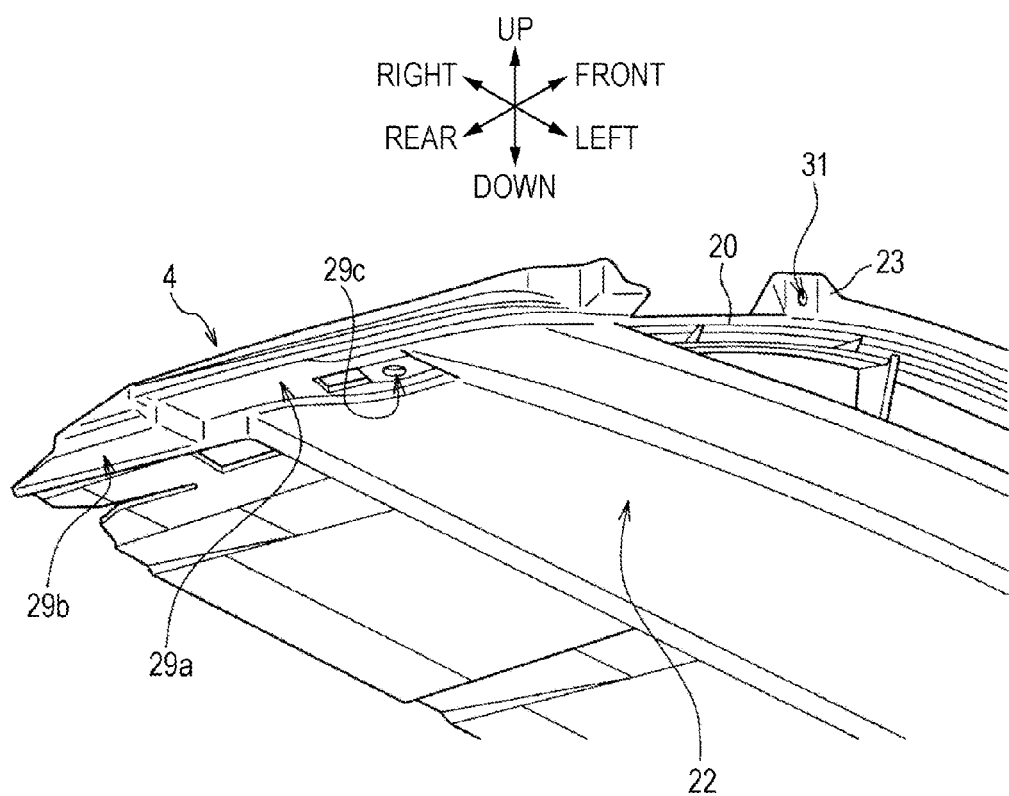
FIG. 6 is a perspective view of a side portion of the lower grille when viewed from the lower right side.

FIG. 6 is a perspective view of a side portion of the lower grille 4 when viewed from the lower right side.

As shown in FIG. 4, the extending portion 22 includes a plurality of vertical walls 27, a weight member 40, and bracket first fixing portions 28 at the upper surface. The bracket first fixing portions 28 are fixed to the brackets 5a that form the design member. As shown in FIG. 6, the extending portion 22 also includes the coupling-portion housing 29a and the step 29b at the bottom surface.

As shown in FIG. 5, each of the vertical walls 27 is formed to protrude from the upper surface of the extending portion 22 in the upper direction and to extend in the front-rear direction along the extending portion 22. The plurality of vertical walls 27 are arranged in the vehicle width direction. Hence, the rigidity of the extending portion 22 in the front-rear direction is increased, and the outside air flowing along the upper surface of the extending portion 22 can be rectified.

As shown in FIG. 4, each of the plurality of vertical walls 27 continuously extends to the partition wall 26 of the protruding portion 21 located on the front side of the extending portion 22. Hence, the rigidity of the coupling portion between the protruding portion 21 and the extending portion 22 is increased, and the rigidity of the entire lower grille 4 in the front-rear direction can be increased.

The weight member 40 is, for example, an iron material (JSH270C) having a weight of about 400 g. The weight member 40 is fixed to the extending portion 22 by a bolt (not shown).

As shown in FIG. 4, the weight member 40 is fixed to a position at a center portion in the vehicle width direction of the extending portion 22, the position being near the rear end portion of the protruding portion 21. Hence, the flow of the outside air introduced from the annular portion 20 arranged at the upper side of the protruding portion 21 can be prevented from being disturbed by the weight member 40.

In the embodiment, the weight member 40 is not particularly limited to the above described weight, material, and specific standard.

As shown in FIG. 5, the bracket first fixing portions 28 extend from both sides of a front end portion of the extending portion 22 to the brackets 5a being the design member, and are fixed to the brackets 5a by screwing.

As shown in FIG. 6, the coupling-portion housing 29a is a recess formed toward the upper direction. The coupling-portion housing 29a is formed at the center of a side portion of the bottom surface of the extending portion 22. The coupling-portion housing 29a can house the coupling portion 14a (see FIG. 3) of the front bumper 3.

The coupling-portion housing 29a of the lower grille 4 is arranged on the upper side of the coupling portion 14a of the front bumper 3.

The coupling-portion housing 29a has a hole 29c for fixing the housed coupling portion 14a. The housed coupling portion 14a is fixed by fastening a bolt and a J nut (not shown).

The step 29b is a portion that is overlaid with the overlay portion 14b (see FIG. 3) of the bottom surface portion 14 of the front bumper 3 in the up-down direction. The step 29b is formed to be recessed toward the upper direction with respect to the bottom surface of the extending portion 22. The step 29b is formed to have a depth equivalent to a thickness of the overlay portion 14b of the bottom surface portion 14 of the front bumper 3.

The step 29b of the lower grille 4 is arranged on the upper side of the overlay portion 14b (see FIG. 3) of the front bumper 3.

The step 29b also has a hole (not shown) for fastening the overlay portion 14b by a clip, and hence the overlay portion 14b is fixed.

The extending portion 22 is fixed in an overlaid manner from the upper side with respect to the pair of bottom surface portions 14, 14. Hence, the extending portion 22 avoids drop-off of the lower grille 4 from the front bumper 3, provides tight coupling, and forms the bottom surface of the vehicle front part 1.

Also, at the portion in which the extending portion 22 is overlaid with the pair of bottom surface portions 14, 14, the coupling portion 14a and the overlay portion 14b are housed in the coupling-portion housing 29a and the step 29b, and become flush with each other. Thus, flatness is provided by the extending portion 22 and the pair of bottom surface portions 14, 14.

FIG. 7 is an enlarged view showing an area surrounded by broken line VII in FIG. 5 in an enlarged manner.

As shown in FIGS. 4 and 5, the reinforcing portion 23 is formed to have a high rigidity, and extends from the upper portion of the annular portion 20 to the upper side of the recessed surface 15 along the vehicle width direction. As shown in FIGS. 5 and 7, the reinforcing portion 23 includes an engaging portion 30 with which the engaged portion 15a of the front bumper 3 is engaged, and bracket second fixing portions 31 fixed to the brackets 5a.

As shown in FIG. 7, the engaging portion 30 has a hole 30a formed at a position corresponding to the engaged portion 15a formed at the recessed surface 15 of the front bumper 3, and the claw 30b extending from an edge of the hole 30a in the lower direction. Hence, the engaged portion 15a is inserted through the hole 30a from the front side. Also, the claw 30b enters the hole 15b of the engaged portion 15a, and the engaged portion 15a is engaged with the engaging portion 30.

Hence, with the above-described configuration, since the engaged portion 15a is engaged with the engaging portion 30, mounting accuracy of the recessed surface 15 with respect to the annular portion 20 of the lower grille 4 can be increased. The lower surface of the annular portion 20 and the lower surface of the recessed surface 15, to which the outside air flows, can become flush with each other.

The bracket second fixing portions 31 extend to the brackets 5a being the design member, and are fixed to the brackets 5a by screwing.

Thus, the lower grille 4 is tightly coupled with the brackets 5a (the design member) arranged on the upper side thereof by the bracket first fixing portions 28 and the bracket second fixing portions 31.

The structure of the vehicle front part 1 according to the embodiment has been described. With the structure of the vehicle front part 1 according to the embodiment, the lower grille 4 is tightly fixed to the pair of bottom surface portions 14, 14 and the brackets 5a of the front bumper 3, and hence the lower grille 4 is arranged on the lower side of the front bumper 3. The lower grille 4 also includes the protruding portion 21 and the reinforcing portion 23 with the high rigidities at the front side of the opening 2.

Hence, if a pedestrian collides with the front bumper 3 of the vehicle V, since the upper portion of the front bumper 3 has a lower rigidity than the rigidity of the lower portion, the upper portion of the front bumper 3 is bent and absorbs the impact.

In contrast, the lower portion of the front bumper 3 can sweep the below knee portions of the pedestrian by the protruding portion 21 and the reinforcing portion 23 without buckling of the lower portion of the front bumper 3.

Also, the upper portion of the front bumper 3 has a larger deformation stroke than that of the lower portion of the front bumper 3 provided with the lower grille 4. Hence, a moment toward the upper direction is generated on the pedestrian who has collided such that the pedestrian is dropped on a hood 9.

As the result, the hood 9 appropriately absorbs the load, and the pedestrian can be protected from the impact caused by the collision.

As described above, with the structure of the vehicle front part 1 according to the embodiment, the safety plate function can be provided without an additionally provided safety plate.

Also, with the structure of the vehicle front part 1 according to the embodiment, the front portion of the protruding portion 21 of the lower grille 4 has the surface 25b (see FIG. 4) extending in the up-down direction. Hence, the pedestrian who collides with the protruding portion 21 receives an impact load by a plane. Accordingly, the legs of the colliding pedestrian can be protected.

Also, with the structure of the vehicle front part 1 according to the embodiment, the upper portion of the front-bumper front surface 10, the upper portion of the front-bumper upper surface 11, and the upper portions of the front-bumper side surfaces 12 are supported by the mount beams etc. (not shown) at the front bumper 3. Hence, vibration is likely generated by oscillation of an engine at the front-bumper lower surface 13 that is not supported.

However, since the lower grille 4 mounted at the lower side of the front bumper 3 includes the weight member 40 and hence the weight is increased, the generation of vibration can be restricted.

Further, since the weight member 40 is provided at the proper position of the extending portion 22 of the lower grille 4, a specific vibration frequency of the lower portion of the front bumper 3 can be changed, and resonance with an idling frequency can be avoided.

Further, the above-described weight member 40 is arranged near the rear side of the protruding portion 21. Accordingly, the rigidity of the front portion of the lower grille 4 is increased, and the safety plate function can be further reliably provided.

With the structure of the vehicle front part 1 according to the embodiment, as shown in FIG. 4, the outside air flows between the recessed surface 15 of the front bumper 3, the front side of which is opened, and the protruding portion 21 of the lower grille 4, and the outside air can be introduced into the annular portion 20 being the opening 2.

Also, the outside air passing through the opening 2 flows along the upper surface of the extending portion 22 of the lower grille 4, and can cool the radiator etc. arranged in the vehicle V.

Also, with the structure of the vehicle front part 1 according to the embodiment, as shown in FIG. 4, the lower surface of the annular portion 20 is flush with the lower surface of the recessed surface 15, and the protruding portion 21 is flush with the annular portion 20. In addition, the extending portion 22 is formed in a substantially horizontal plane. Hence, the flow of the outside air flowing into the flow path formed by the recessed surface 15 of the front bumper 3 and the annular portion 20 of the lower grille 4 is not disturbed, and the rectified outside air can be introduced into the opening 2.

As described above, with the structure of the vehicle front part 1 according to the embodiment, the rectified outside air can be supplied to the radiator etc., and thus cooling performance can be increased.

Also, in the embodiment, the bottom surface of the vehicle front part 1 formed by the pair of bottom surface portions 14, 14 of the front bumper 3 and the extending portion 22 of the lower grille 4 is generally a substantially flat plane.

Hence, a function of rectifying the outside air flowing along the bottom surface of the front bumper 3 can be provided during driving, and aerodynamic performance can be increased.

The vehicle front structure according to the embodiment has been described above. However, the present application is not limited to the vehicle front structure of the embodiment, and the vehicle front structure may be appropriately modified in accordance with the structure of the vehicle V.

I claim:

1. A vehicle front structure, comprising:
   a front bumper provided at a vehicle front part and extending in a vehicle width direction; and
   a lower grille provided on a lower side of the front bumper and including an opening for flowing outside air into a vehicle therethrough,
   wherein the front bumper includes a front-bumper lower surface provided along a lower edge of the front-bumper and extending in a vehicle rear direction, the front-bumper lower surface including:
   a pair of bottom surface portions provided at respective sides in the vehicle width direction, the pair of bottom surface portions forming a bottom surface of the front bumper, and
   a recessed surface provided at a center portion in the vehicle width direction, the recessed surface extending from the pair of bottom surface portions and being recessed to an upper direction, and
   wherein the lower grille includes:
   an annular portion provided on a lower side of and at a rear end of the recessed surface, the annular portion including an upper member extending in the vehicle width direction and a lower member extending in the vehicle width direction, the opening disposed between the upper member and the lower member, and the upper member having a convex shape in front view of the vehicle,
   a protruding portion protruding from the lower member of the annular portion so as to protrude in a front direction of the vehicle and oppose to the recessed surface, an extending portion extending from an end of the protruding portion to an area between the pair of bottom surface portions, and mounted to the pair of bottom surface portions, and a reinforcing portion extending from the upper member of the annular portion to a back surface of the recessed surface so as to reinforce the front-bumper lower surface.

2. The vehicle front structure according to claim 1, wherein the protruding portion includes:
   a fold-back portion extending from the lower member of the annular portion in the front direction of the vehicle to oppose to the recessed surface, bending down, and extending in the rear direction to be continuous with the extending portion, and
   a partition wall provided on an inner side of the fold-back portion to partition a space extending in the vehicle width direction, the partition wall including a notch at a rear end thereof.

3. The vehicle front structure according to claim 1, wherein the protruding portion includes
   a fold-back portion protruding from the lower member of the annular portion in the front direction of the vehicle to oppose to the recessed surface, bending down, and extending in the rear direction to be continuous with the extending portion,
   a partition wall provided on an inner side of the fold-back portion to partition a space extending in the vehicle width direction, and
wherein the extending portion includes
   a plurality of vertical walls provided on an upper surface thereof and extending in a front-rear direction, and
wherein the partition wall continuously extends to at least one of the plurality of vertical walls in the front-rear direction.

4. The vehicle front structure according to claim 1, wherein the extending portion is formed in a substantially horizontal plane, and
wherein the bottom surface of the front bumper formed by the pair of bottom surface portions and the extending portion mounted between the pair of bottom surface portions is a substantially flat plane.

5. The vehicle front structure according to claim 1, wherein the front bumper includes a design member at a front surface, and
wherein the lower grille includes a coupling portion coupled to the design member.

6. The vehicle front structure according to claim 1, wherein the front bumper includes
   a front-bumper upper surface extending from an upper end thereof toward the rear direction of the vehicle, and
   a pair of front-bumper side surfaces extending from both left and right ends thereof toward the rear direction of the vehicle,
wherein the lower grille includes a weight member attached to a center portion in the vehicle width direction of the extending portion,
wherein the front-bumper upper surface is supported by a frame member of the vehicle, and
wherein the pair of front-bumper side surfaces are supported by fenders provided at both side portions of the vehicle.

7. The vehicle front structure according to claim 1, wherein the upper member of the annular portion has an arc shape in the front view of the vehicle.

* * * * *